US012674683B2

(12) United States Patent
Kokubo et al.

(10) Patent No.: US 12,674,683 B2
(45) Date of Patent: Jul. 7, 2026

(54) MAP DATA GENERATION DEVICE, MAP DATA GENERATION SYSTEM, AND STORAGE MEDIUM

(71) Applicant: DENSO CORPORATION, Kariya-city (JP)

(72) Inventors: Yuko Kokubo, Kariya-city (JP); Hiroyuki Kitagawa, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 36 days.

(21) Appl. No.: 18/430,508

(22) Filed: Feb. 1, 2024

(65) Prior Publication Data

US 2024/0200977 A1     Jun. 20, 2024

Related U.S. Application Data

(63) Continuation of application No. PCT/JP2022/026596, filed on Jul. 4, 2022.

(30) Foreign Application Priority Data

Aug. 2, 2021     (JP) ................................ 2021-126700

(51) Int. Cl.
*G01C 21/00* (2006.01)
*G01S 19/07* (2010.01)

(52) U.S. Cl.
CPC ..... *G01C 21/3859* (2020.08); *G01C 21/3841* (2020.08); *G01S 19/071* (2019.08)

(58) Field of Classification Search
CPC ............ G01C 21/3859; G01C 21/3841; G01S 19/071
USPC ......................................................... 701/450
See application file for complete search history.

(56) References Cited

U.S. PATENT DOCUMENTS

| 2010/0073228 | A1* | 3/2010 | Smith | G01S 19/235 |
| | | | | 342/357.41 |
| 2017/0329019 | A1* | 11/2017 | Croyle | G01S 19/47 |
| 2020/0326190 | A1* | 10/2020 | Miyao | G01C 21/28 |
| 2021/0180985 | A1 | 6/2021 | Yokota et al. | |

FOREIGN PATENT DOCUMENTS

EP     3726252 A1 * 10/2020     ........... G01C 21/165

* cited by examiner

*Primary Examiner* — Helal A Algahaim
*Assistant Examiner* — John D Holman
(74) *Attorney, Agent, or Firm* — Precision Patents, P.C.

(57) ABSTRACT

A map data generation device receives probe data including travel information and GNSS information from an in-vehicle device. The map data generation device includes a correlation coefficient calculation unit that calculates a correlation coefficient indicating a correlation between the travel information and the GNSS information included in probe data, a delay time calculation unit that calculates GNSS delay time based on the correlation coefficient, a delay time correction unit that performs delay time correction for the GNSS information based on the GNSS delay time, and a map data generation unit that corrects the probe data using the GNSS information that has been subjected to the delay time correction to generate map data using the corrected probe data.

9 Claims, 14 Drawing Sheets

Figure 4:
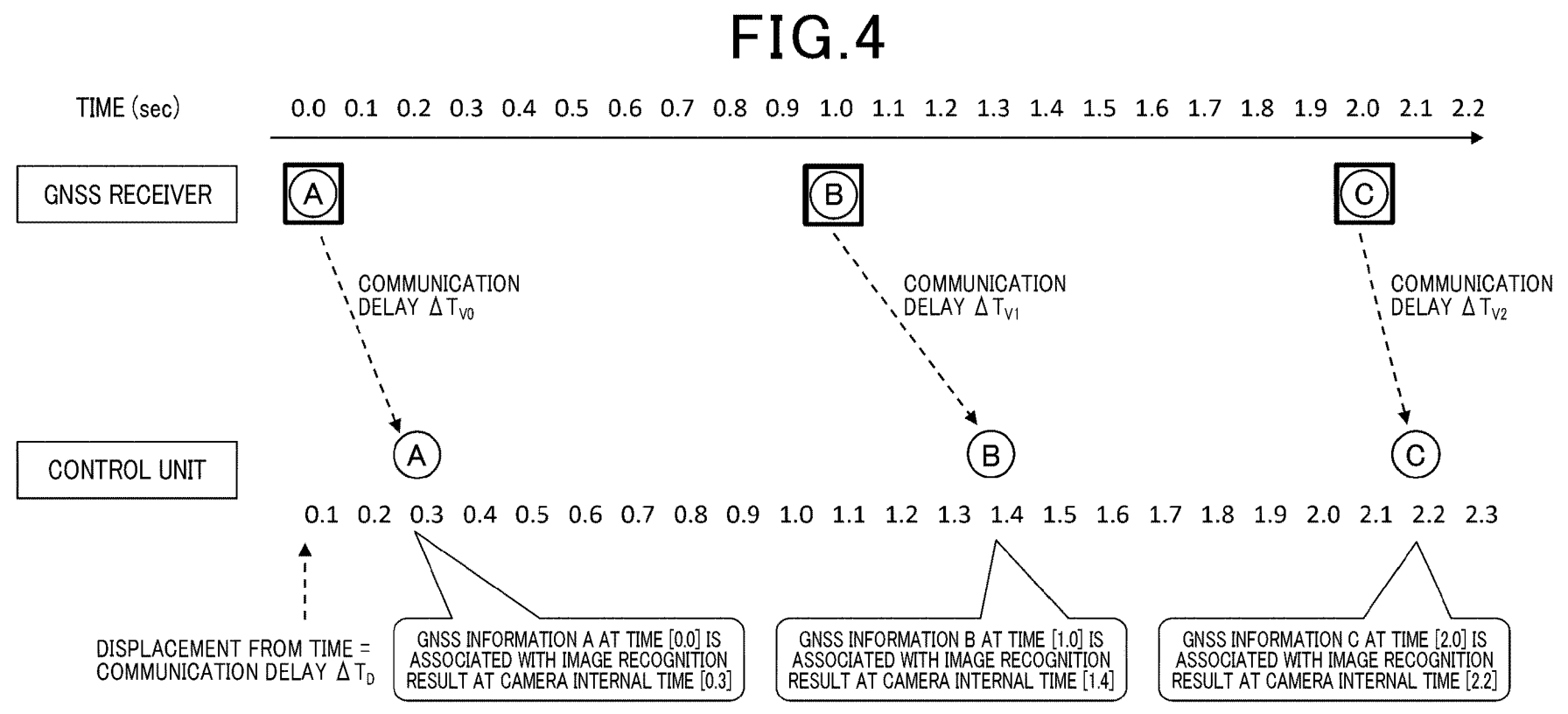

TIME (sec)

GNSS RECEIVER 0.0 0.1 0.2 0.3 0.4 0.5 0.6 0.7 0.8 0.9 1.0 1.1 1.2 1.3 1.4 1.5 1.6 1.7 1.8 1.9 2.0 2.1 2.2

COMMUNICATION DELAY $\Delta T_{V0}$

COMMUNICATION DELAY $\Delta T_{V1}$

COMMUNICATION DELAY $\Delta T_{V2}$

CONTROL UNIT 0.1 0.2 0.3 0.4 0.5 0.6 0.7 0.8 0.9 1.0 1.1 1.2 1.3 1.4 1.5 1.6 1.7 1.8 1.9 2.0 2.1 2.2 2.3

DISPLACEMENT FROM TIME = COMMUNICATION DELAY $\Delta T_D$

GNSS INFORMATION A AT TIME [0.0] IS ASSOCIATED WITH IMAGE RECOGNITION RESULT AT CAMERA INTERNAL TIME [0.3]

GNSS INFORMATION B AT TIME [1.0] IS ASSOCIATED WITH IMAGE RECOGNITION RESULT AT CAMERA INTERNAL TIME [1.4]

GNSS INFORMATION C AT TIME [2.0] IS ASSOCIATED WITH IMAGE RECOGNITION RESULT AT CAMERA INTERNAL TIME [2.2]

Figure 8:
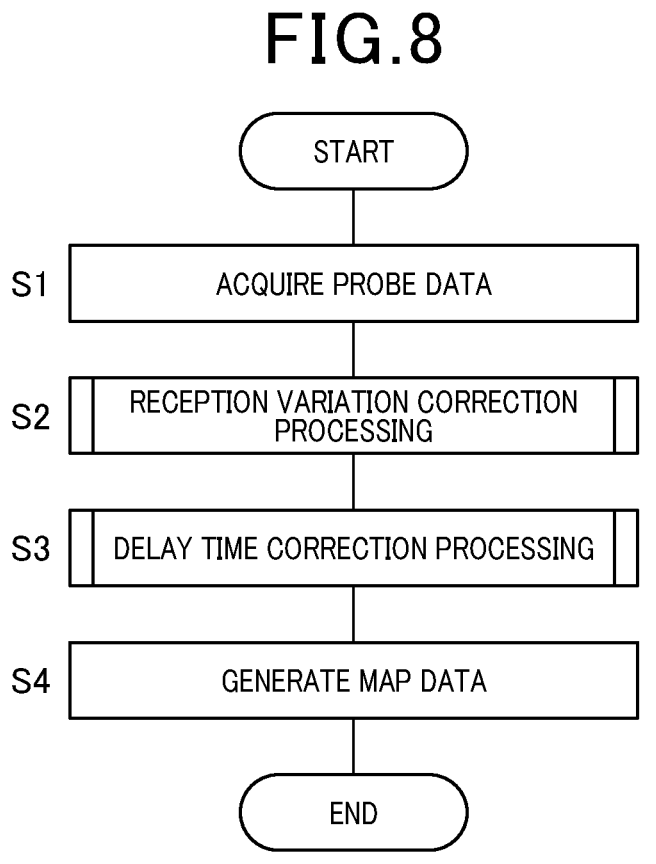

START

S1 ACQUIRE PROBE DATA

S2 RECEPTION VARIATION CORRECTION PROCESSING

S3 DELAY TIME CORRECTION PROCESSING

S4 GENERATE MAP DATA

END

FIG.11

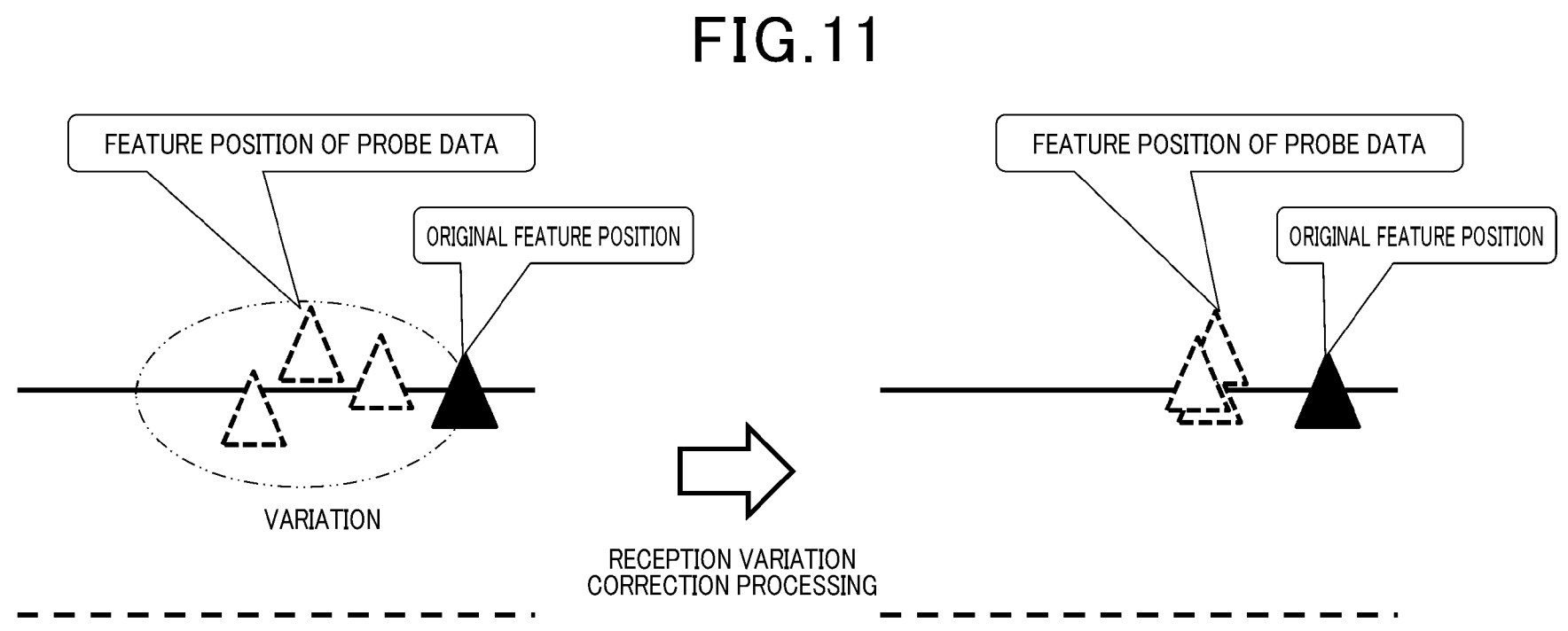

ORIGINAL FEATURE POSITION

FEATURE POSITION OF PROBE DATA

FEATURE POSITION OF PROBE DATA

ORIGINAL FEATURE POSITION

VARIATION

RECEPTION VARIATION
CORRECTION PROCESSING

FIG.12

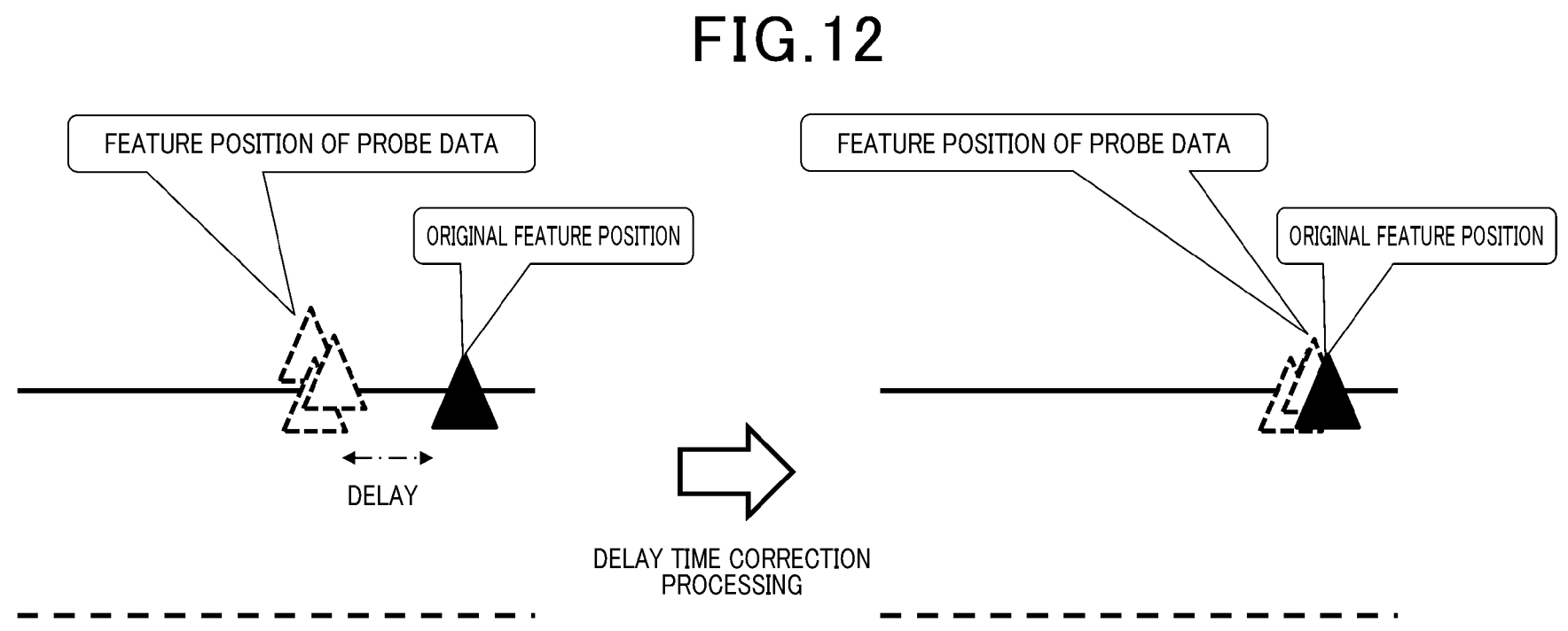

ORIGINAL FEATURE POSITION

FEATURE POSITION OF PROBE DATA

DELAY TIME CORRECTION PROCESSING

ORIGINAL FEATURE POSITION

FEATURE POSITION OF PROBE DATA

DELAY

MAP DATA GENERATION DEVICE, MAP DATA GENERATION SYSTEM, AND STORAGE MEDIUM

CROSS-REFERENCE TO RELATED APPLICATION

The present application is based on and claims the benefit of priority from earlier Japanese Patent Application No. 2021-126700 filed on Aug. 2, 2021, the description of which is incorporated herein by reference.

BACKGROUND

Technical Field

The present disclosure relates to a map data generation device, a map data generation system, and a map data generation program.

Related Art

Map data generation devices have been provided which generate map data using probe data transmitted from an in-vehicle device.

SUMMARY

An aspect of the present disclosure provides a map data generation device that receives probe data including travel information and GNSS information from an in-vehicle device. The map data generation device including: a correlation coefficient calculation unit that calculates a correlation coefficient indicating a correlation between the travel information and the GNSS information included in probe data; a delay time calculation unit that calculates GNSS delay time based on the correlation coefficient; a delay time correction unit that performs delay time correction for the GNSS information based on the GNSS delay time; and a map data generation unit that corrects the probe data using the GNSS information that has been subjected to the delay time correction to generate map data using the corrected probe data.

BRIEF DESCRIPTION OF THE DRAWINGS

In the accompanying drawings:

FIG. 2 is a diagram schematically illustrating a flow of a process;

FIG. 4 is a diagram illustrating a mode in which the GNSS information is associated with results of image recognition;

FIG. 7 is a diagram illustrating a mode in which a GNSS speed is subjected to delay time correction;

FIG. 8 illustrates a flowchart;

FIG. 11 is a diagram illustrating a mode before and after reception variation correction processing;

FIG. 12 is a diagram illustrating a mode before and after delay time correction processing;

DETAILED DESCRIPTION OF THE PREFERRED EMBODIMENTS

Map data generation devices have been provided which generate map data using probe data transmitted from an in-vehicle device. For example, JP-A-2020-38356 discloses a method of using common landmarks that are common among a plurality of segments to set division lines in the segments and specifying the division lines in the set segments as division lines on a map to generate map data. Since the method according to JP-A-2020-38356 does not use GNSS (Global Navigation Satellite System) coordinates having great variation but sets division lines in the segments using the common landmarks and specifies the set division lines as division lines on a map to generate map data, the map data having high accuracy can be generated using a smaller number of samples.

The probe data transmitted from the in-vehicle device includes, in addition to the result of image recognition and sensor information, GNSS information. The map data generation device corrects the probe data using the GNSS information and generates map data using the corrected probe data. In the vehicle, the in-vehicle device and a GNSS receiver are connected via a gateway, and the GNSS information is input to the in-vehicle device from the GNSS receiver via the gateway. According to this configuration, due to a communication delay, delayed GNSS information in the direction opposite to the traveling direction is acquired while the vehicle is traveling. Hence, displacements are generated between the result of image recognition of a camera image captured by an in-vehicle camera and the sensor information, and the GNSS information. Displacements are also generated between absolute positions of features in the map data generated by integrating the probe data.

The present disclosure aims to appropriately generate a map data in a state in which influence of communication delay is avoided.

Figure 1:
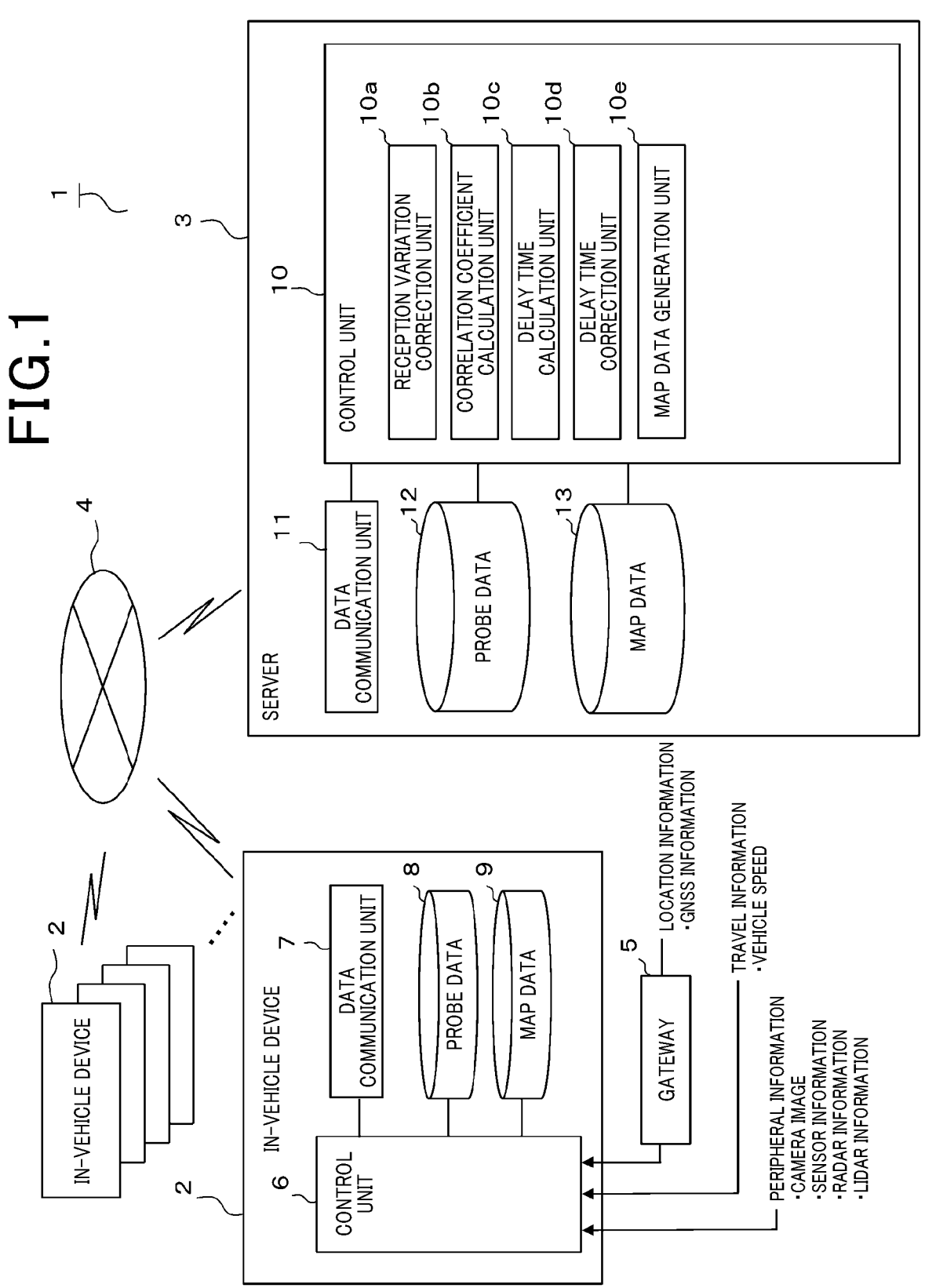
FIG. 1 is a functional block diagram illustrating an overall configuration of a map data generation system according to an embodiment.

Hereinafter, an embodiment will be described with reference to the drawings. As illustrated in FIG. 1, a map data generation system 1 is configured so that in-vehicle devices 2 installed in vehicles and a server 3 disposed at the network side can perform data communication via a communication network 4 including, for example, the Internet. The vehicle in which the in-vehicle device 2 is installed may be a vehicle having an autonomous driving function or a vehicle having no autonomous driving function. The vehicle having an autonomous driving function travels while sequentially switching between autonomous driving and manual driving. A plurality of in-vehicle devices 2 are related to one server 3, and the server 3 can perform data communication with the plurality of in-vehicle devices 2. The server 3 corresponds to a map data generation device.

The in-vehicle device 2 receives peripheral information on the periphery of the vehicle from various sensors and various ECUs (electronic control units) installed in the vehicle, travel information on travel of the vehicle, and location information on locations of the vehicle. The in-vehicle device 2 receives, as the peripheral information, camera images of areas in the traveling direction of the vehicle captured by an in-vehicle camera, sensor information on the periphery of the vehicle detected by a sensor, for example, a millimeter-wave sensor, radar information on the periphery of the vehicle detected by a radar, lidar information on the periphery of the vehicle detected by a LIDAR (Light Detection and Ranging, Laser Imaging Detection and Ranging), and the like. The camera images include images of a traffic light, a traffic sign, and a signboard, which are installed on a road, a division line, a stop line of an intersection, a pedestrian crossing, a diamond-shaped mark in the intersection, which are painted on the surface of the road, and the like. The in-vehicle device 2 may receive, as the peripheral information, at least one of the camera image, the sensor information, the radar information, and the lidar information.

The in-vehicle device 2 receives, as the travel information, vehicle speed information detected by a vehicle sensor. The in-vehicle device 2 receives, as the location information, GNSS information obtained by positioning by a GNSS (Global Navigation Satellite System) receiver via a gateway 5 serving as a repeater. The GNSS information includes GNSS coordinates indicating an absolute position and a GNSS speed indicating a speed. GNSS is a generic name for global navigation satellite systems and is implemented as various systems such as GPS (Global Positioning System). GLONASS (Global Navigation Satellite System). Galileo. BeiDou. IRNSS (Indian Regional Navigational Satellite System), and the like.

The in-vehicle device 2 includes a control unit 6, a data communication unit 7, a probe data storge unit 8, and a map data storage unit 9. The control unit 6 is configured by a microcomputer having a CPU (Central Processing Unit), a ROM (Read Only Memory), a RAM (Random Access Memory), and an I/O (Input/Output). The microcomputer executes a computer program stored in a non-transitory tangible storage medium to perform a process corresponding to the computer program, thereby controlling the overall operation of the in-vehicle device 2. The microcomputer is equivalent to a processor. In the in-vehicle device 2, the hardware of the non-transitory tangible storage medium may be shared with other computer resources. Each of the probe data storge unit 8 and the map data storage unit 9 may be mainly configured by one or a plurality of non-transitory tangible storage mediums independently provided for corresponding data. The probe data storge unit 8 and the map data storage unit 9 may be mainly configured by a common non-transitory tangible storage medium. The probe data storge unit 8 and the map data storage unit 9 may correspond to one storage medium or part of storage areas of one or a plurality of storage mediums. A storage unit may be configured so as to include at least one of the probe data storge unit 8 and the map data storage unit 9. The storage unit may further include a circuit for reading and rewriting data.

The server 3 includes a control unit 10, a data communication unit 11, a probe data storage unit 12, and a map data storage unit 13. The control unit 10 is configured by a microcomputer having a CPU, a ROM, a RAM, and an I/O. The microcomputer executes a computer program stored in the non-transitory tangible storage medium to perform a process corresponding to the computer program, thereby controlling the overall operation of the server 3. Also in the server 3, the hardware of the non-transitory tangible storage medium may be shared with other computer resources. Each of the probe data storage unit 12 and the map data storage unit 13 may be mainly configured by a non-transitory tangible storage medium independently provided for corresponding data.

In the in-vehicle device 2, when receiving peripheral information, travel information, and location information, the control unit 6 generates probe data from the input various types of information and stores the generated probe data in the probe data storge unit 8. The probe data includes the peripheral information, the travel information, the location information, and data indicating locations, colors, features, relative positional relationships, and the like of a traffic light, a traffic sign, and a signboard, which are installed on the road, a division line, a stop line of an intersection, a pedestrian crossing, a diamond-shaped mark in the intersection, and the like. The probe data also includes data indicating a shape, features, a width, and the like concerning the road on which the vehicle is traveling.

For example, when a predetermined time period has elapsed, or the travel distance of the vehicle has reached a predetermined distance, the control unit 6 reads probe data stored in the probe data storge unit 8 and causes the data communication unit 7 to transmit the read probe data to the server 3. Other than using the elapsed time period and the travel distance of the vehicle, if the server 3 is configured to transmit a probe data transmission request to the in-vehicle device 2 at predetermined intervals, when the data communication unit 7 receives the probe data transmission request transmitted from the server 3, the control unit 6 may read the probe data stored in the probe data storge unit 8 and cause the data communication unit 7 to transmit the read probe data to the server 3. Alternatively, for example, the control unit 6 may, at the ignition-on time, cause the data communication unit 7 to transmit probe data, which is stored during a trip from the previous ignition-on time to the ignition-off time, to the server 3, or may, at the ignition-off time, cause the data communication unit 7 to transmit probe data, which is stored during a trip from the current ignition-on time to the ignition-off time, to the server 3. When causing the data communication unit 7 to transmit probe data to the server 3, the control unit 6 may cause the data communication unit 7 to transmit the probe data to the server 3 in a segment unit, which is a unit of an area predetermined for managing a map or may cause the data communication unit 7 to transmit the probe data to the server 3 in a unit of a predetermined area that is not related to the segment unit.

The map data storage unit 9 stores highly accurate map data for achieving driving assistance. The map data stored in the map data storage unit 9 includes three-dimensional map information, feature information, attribute value information on roads, and the like. The three-dimensional map information includes road shapes and feature points of structures. The feature information is information on shapes and locations of a traffic light, a traffic sign, a signboard, a division line, a stop line of an intersection, a pedestrian crossing, a diamond-shaped mark in the intersection, and the like. The attribute value information on roads is information on lanes of the roads and on the number of the lanes, presence or absence of right turn-only lanes, and the like. The map data stored in the map data storage unit 9 is sequentially updated when map data stored in the map data storage unit 13 of the server 3 described later is downloaded from the server 3 to the in-vehicle device 2.

In the server 3, the map data storage unit 13 stores highly accurate map data for achieving driving assistance. The map data stored in the map data storage unit 13 has a capacity larger than that of the map data stored in the map data storage unit 9 of the in-vehicle device 2 and reflects information of a wide area. The control unit 10 receives the probe data transmitted from the in-vehicle device 2 by the data communication unit 11 and causes the probe data storage unit 12 to store the received probe data. The control unit 10 reads the probe data stored in the probe data storage unit 12 and sequentially reflects the read probe data on the map data stored in the map data storage unit 13 to sequentially update the map data. That is, the map data stored in the map data storage unit 13 is an integrated map data generated by integrating a plurality of probe data.

In the configuration described above in which GNSS information is input from the GNSS receiver to the server 3 via the gateway 5, due to a communication delay, delayed GNSS information in the direction opposite to the traveling direction is acquired while the vehicle is traveling. Hence, displacements are generated between the result of image recognition of an image captured by the in-vehicle device and the sensor information, and the GNSS information. Displacements are also generated between absolute positions of features in the map data generated using the probe data. Under the circumstances, in the present embodiment, the in-vehicle device 2 and the server 3 have the following functions.

Figure 2:
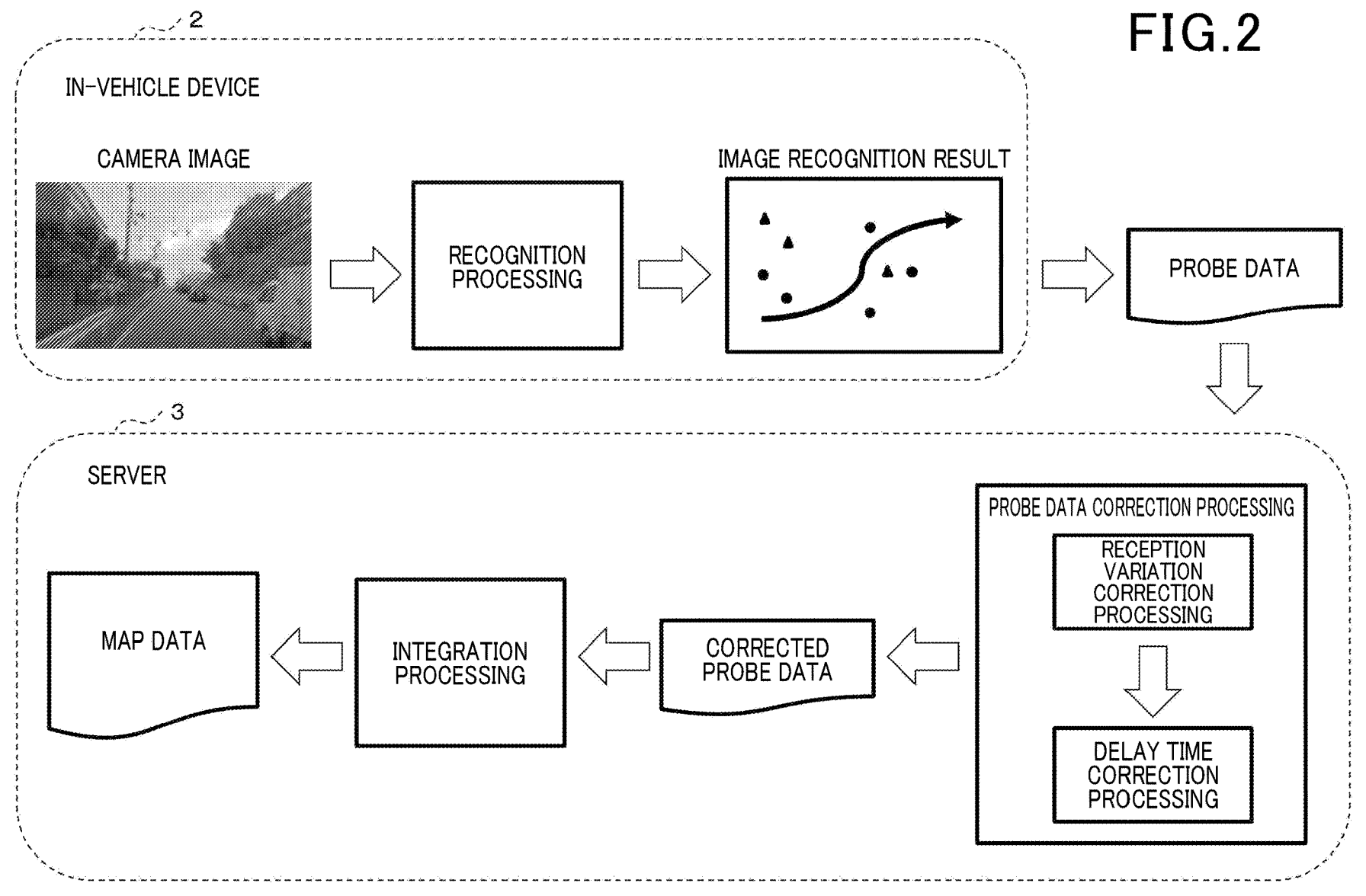

As illustrated in FIG. 2, in the in-vehicle device 2, the control unit 6 performs recognition processing for camera images of areas in the traveling direction of the vehicle captured by the in-vehicle camera and causes the data communication unit 7 to transmit probe data, which includes the image recognition result of the recognition processing for the camera images, to the server 3. In this case, on receiving GNSS information obtained by positioning by the GNSS receiver, the control unit 6 causes the data communication unit 7 to transmit the probe data, which includes positioning time information corresponding to the GNSS information, to the server 3. The positioning time information corresponding to the GNSS is information indicating the time at which the GNSS receiver has received the GNSS information and is information indicating the time at which the positioning is performed.

In the server 3, when the data communication unit 11 receives the probe data transmitted from the in-vehicle device 2, the control unit 10 performs reception variation correction processing for correcting a short-term variation, as probe data correction processing for correcting the received probe data, and performs delay time correction processing for correcting a steady communication delay. The control unit 10 integrates the probe data corrected by the probe data correction processing to perform integration processing for generating map data.

In the server 3, the control unit 10 has a reception variation correction unit 10a, a correlation coefficient calculation unit 10b, a delay time calculation unit 10c, a delay time correction unit 10d, and a map data generation unit 10e. The units 10a to 10e correspond to part of functions performed by a map data generation program. That is, the control unit 10 executes part of the map data generation program to perform functions of the units 10a to 10e.

Figure 3:
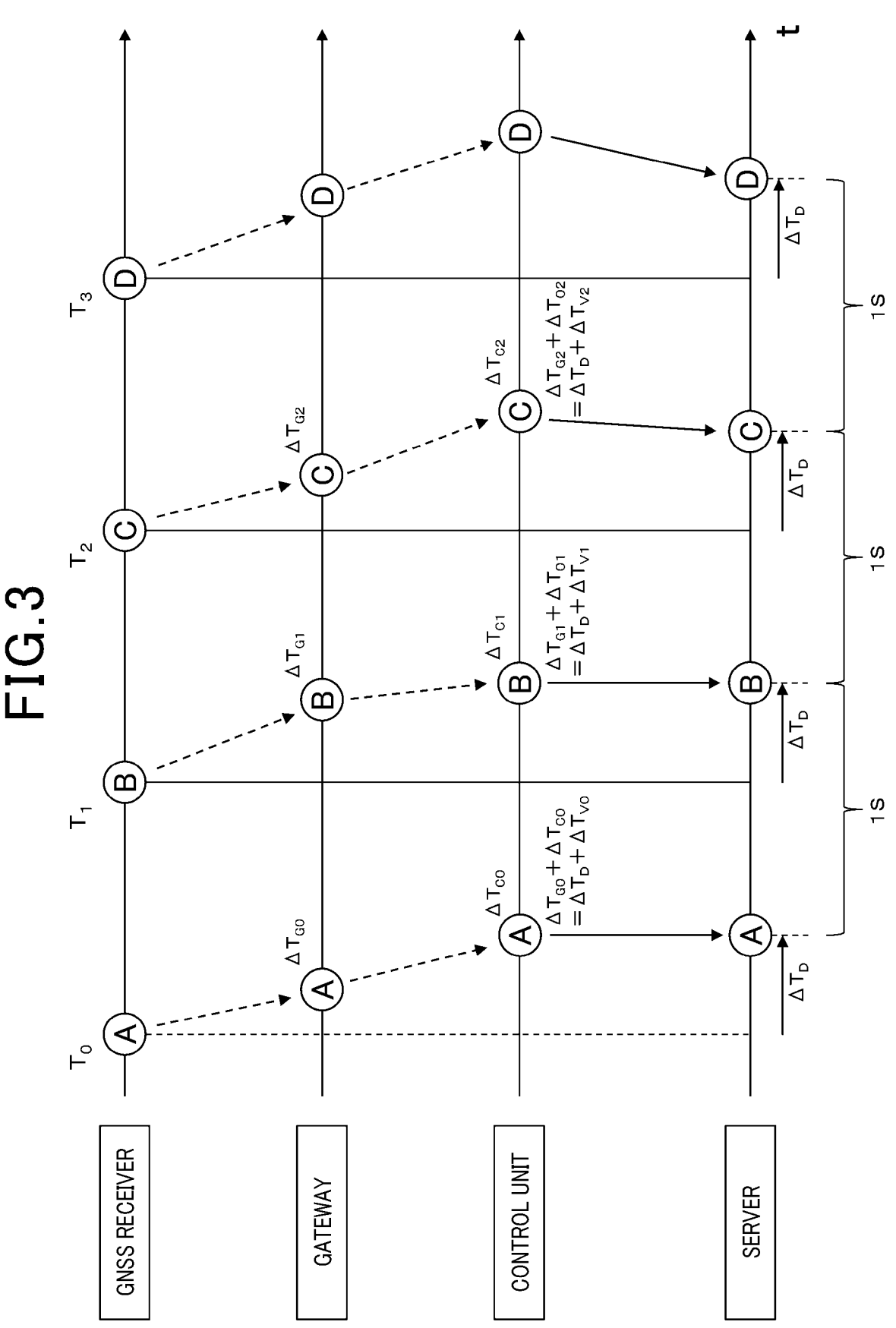
FIG. 3 is a diagram illustrating a mode in which GNSS information is delayed.

The reception variation correction unit 10a performs reception variation correction for the GNSS information based on the positioning time information. As illustrated in FIG. 3, the reception variation correction unit 10a calculates a communication delay $\Delta TGn$ (n is an integer of 0 or more) from the GNSS receiver to the gateway and a communication delay $\Delta TCn$ (n is an integer of 0 or more) from the gateway to the control unit 10, and subtracts a communication delay of GNSS information A as a temporary steady delay $\Delta Tp$ from the sum of the communication delay $\Delta TGn$ and the communication delay $\Delta TCn$ to calculate a short-term variation $\Delta TVn$ (n is an integer of 0 or more). In a case in which GNSS information is acquired at intervals of 1[s], and the result of image recognition of the camera image is acquired at intervals of 0.1[s], in the example in FIG. 4, due to communication delays, GNSS information A at time [0.0] is associated with the result of image recognition at camera internal time [0.3], GNSS information B at time [1.0] is associated with the result of image recognition at camera internal time [1.4], and GNSS information C at time [2.0] is associated with the result of image recognition at camera internal time [2.2].

Figure 5:
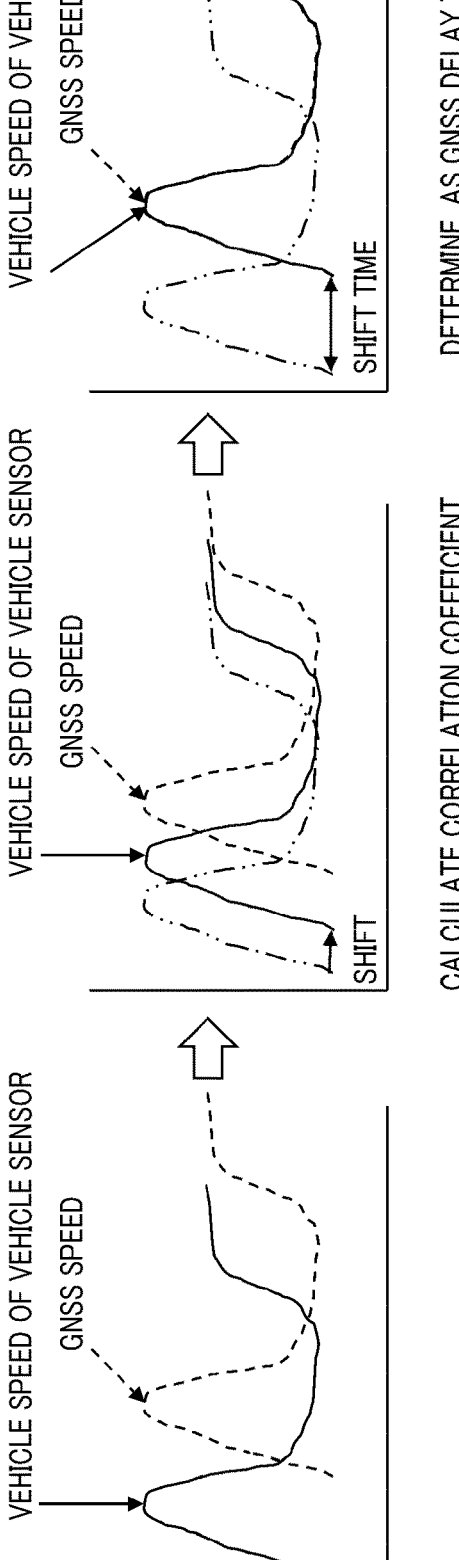
FIG. 5 is a diagram illustrating a mode in which GNSS delay time is calculated.

The correlation coefficient calculation unit 10b calculates a correlation coefficient indicating a correlation between travel information and GNSS information included in probe data. As illustrated in FIG. 5, the correlation coefficient calculation unit 10b calculates a correlation coefficient while shifting a vehicle speed of the vehicle sensor.

Figure 6:
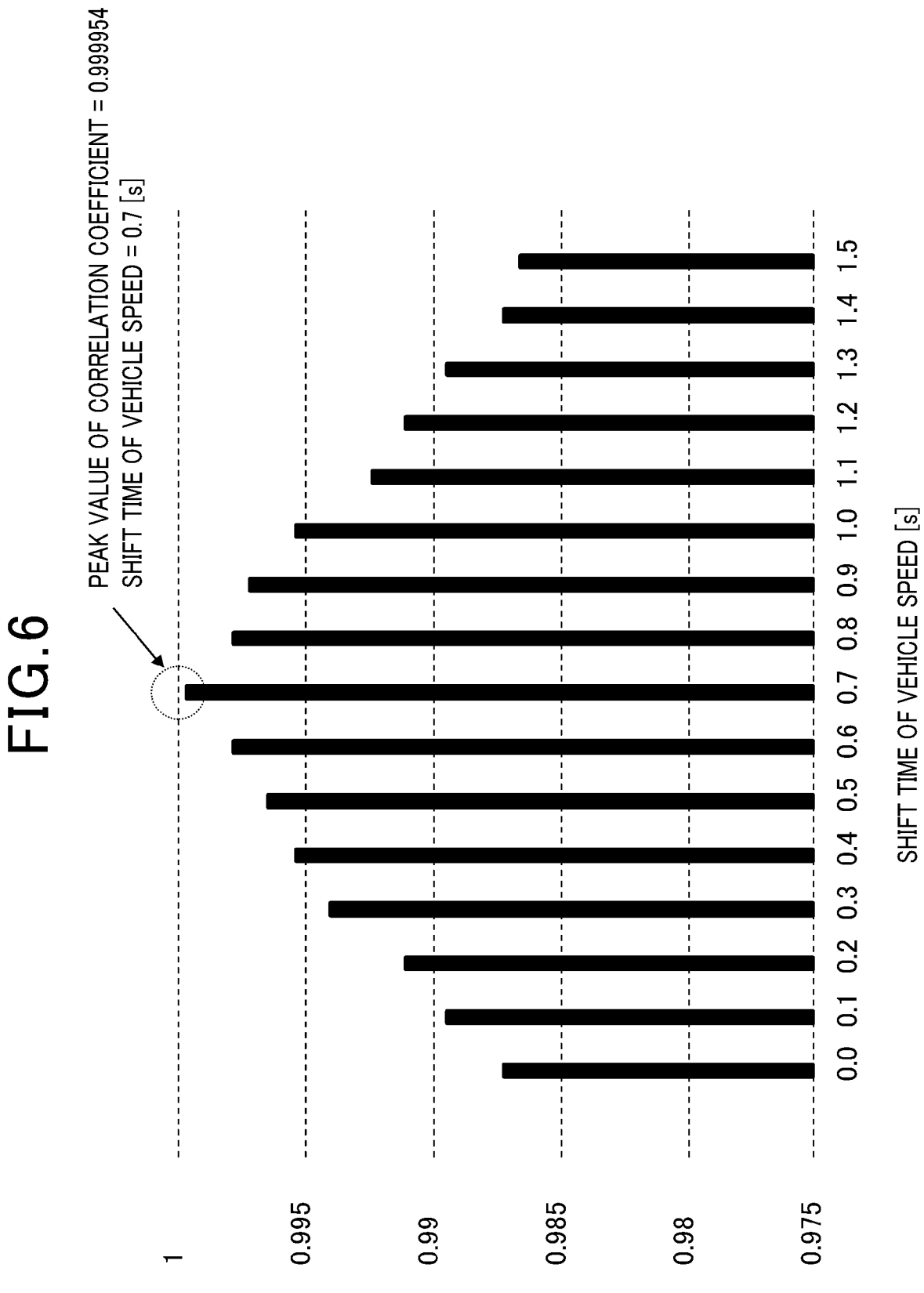
FIG. 6 is a diagram illustrating a peak value of a correlation coefficient.
Figure 9:
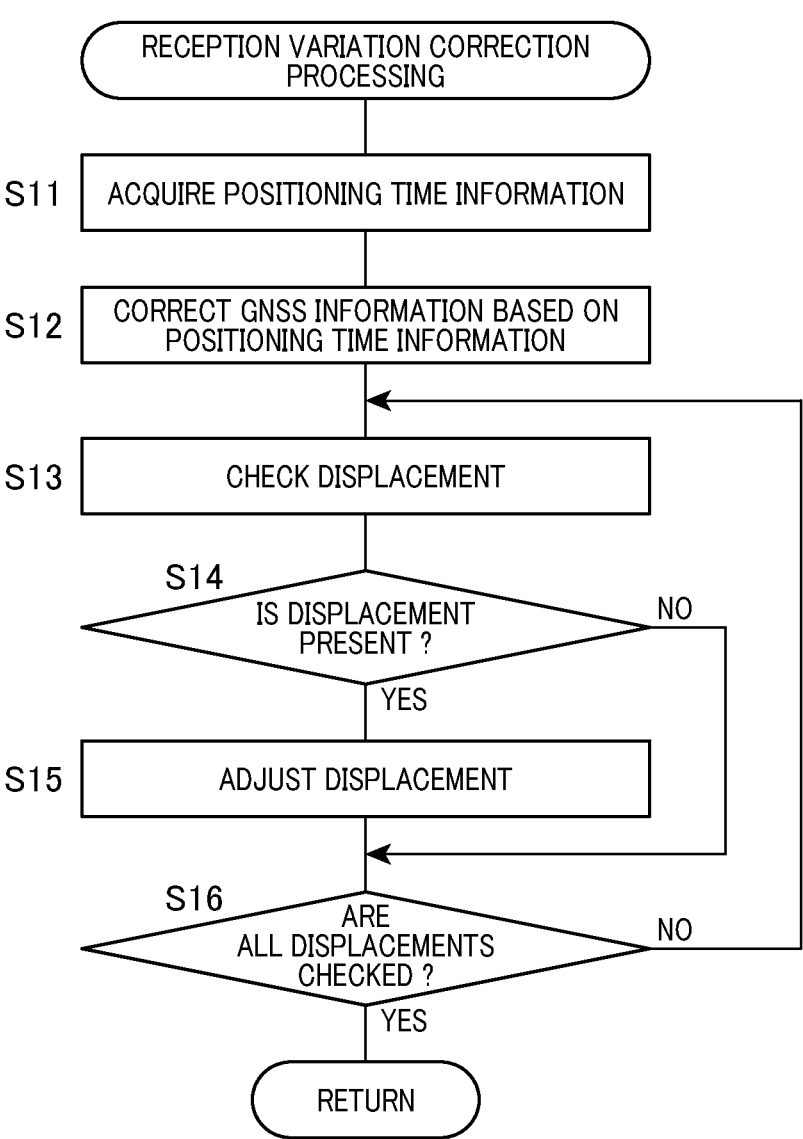
FIG. 9 illustrates a flowchart.
Figure 10:
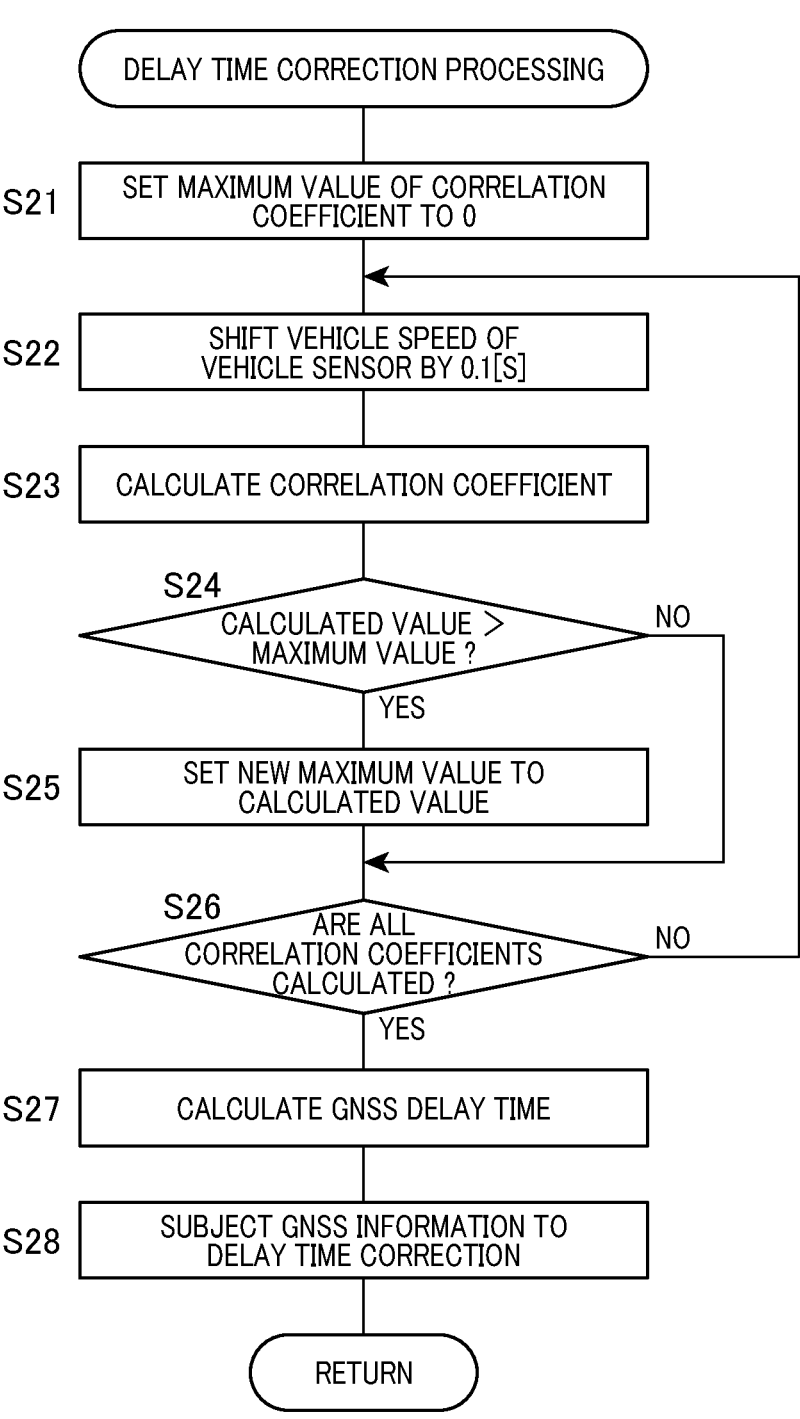
FIG. 10 illustrates a flowchart.

After the correlation coefficient is calculated by the correlation coefficient calculation unit 10b, the delay time calculation unit 10c calculates GNSS delay time based on the calculated correlation coefficient. As illustrated in FIG. 6, the delay time calculation unit 10c determines, as the GNSS delay time, shift time of the vehicle speed in a case in which the correlation coefficient is the maximum value to calculate the GNSS delay time. In the example in FIG. 6, the delay time calculation unit 10c calculates 0.7[s] as the GNSS delay time.

Figure 7:
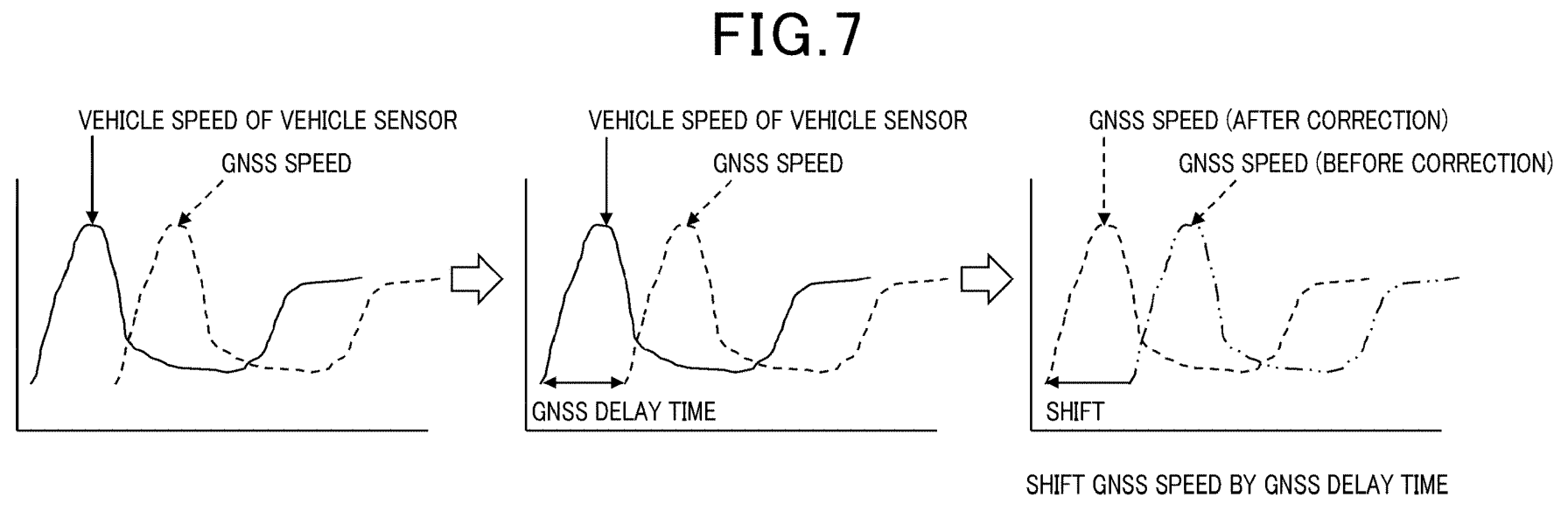

After the GNSS delay time is calculated by the delay time calculation unit 10c, the delay time correction unit 10d performs delay time correction for the GNSS information based on the calculated GNSS delay time. As illustrated in FIG. 7, the delay time correction unit 10d shifts the GNSS speed as the GNSS information by the GNSS delay time to perform the delay time correction for the GNSS speed.

After the GNSS information is subjected to the reception variation correction by the reception variation correction unit 10a, and the GNSS information is subjected to the delay time correction by the delay time correction unit 10d, the map data generation unit 10e corrects the probe data using the GNSS information that has been subjected to the reception variation correction and the delay time correction, and integrates the corrected probe data to generate map data.

Next, functions of the above configuration will be described with reference to FIG. 8 to FIG. 14.

In the server 3, if conditions for generating map data are met, and a start event of a map data generation process is executed, the control unit 10 reads and acquires the probe data stored in the probe data storage unit 12 (S1) and proceeds to the reception variation correction processing (S2).

On starting the reception variation correction processing, the control unit 10 acquires positioning time information from the acquired probe data (S11). The control unit 10 corrects the GNSS information at intervals of 1[s] based on the positioning time information (S12) and checks a displacement of the GNSS information (S13) to determine presence or absence of a displacement (S14).

If determining that a displacement is present (S14), the control unit 10 adjusts the displacement (S15). The control unit 10 determines whether displacements are checked for all the probe data in a target range of generating map data (S16). If determining that displacements are not checked for all the probe data in the target range of generating map data and determining that there is probe data whose displacement is not checked (S16: NO), the control unit 10 returns to step S13 and repeats step S13 and later steps.

If determining that displacements are checked for all the probe data in the target range of generating map data and determining that there is no probe data whose displacement is not checked (S16: YES), the control unit 10 terminates the reception variation correction processing, and proceeds to the delay time correction processing (S3). By performing the reception variation correction processing to, as illustrated in FIG. 11, the control unit 10 cancels variation of a feature position of the probe data to avoid being affected by the short-term variation.

On starting the delay time correction processing, the control unit 10 sets a maximum value to 0 as an initial value of the correlation coefficient (S21). The control unit 10 shifts vehicle speed of the vehicle sensor by 0.1[s] in a predetermined range (S22) to calculate correlation coefficients (S23, corresponding to a correlation coefficient calculation step). The control unit 10 compares a calculated value that is the calculated correlation coefficient with the maximum value (S24). If determining that the calculated value is larger than the maximum value (S24: YES), the control unit 10 sets a new maximum value to the calculated value (S25).

The control unit 10 determines whether correlation coefficients are calculated for all the predetermined range (S26). If determining that correlation coefficients are not calculated for all the predetermined range and determining that there is a range in which no correlation coefficient is calculated (S26: NO), the control unit 10 returns to step S22 and repeats step S22 and later steps.

If determining that correlation coefficients are calculated for all the predetermined range and determining that there is no range in which no correlation coefficient is calculated (S26: YES), the control unit 10 calculates, as the GNSS delay time, shift time of the vehicle speed in a case in which the correlation coefficient is the maximum value (S27, corresponding to a delay time calculation step). The control unit 10 shifts the shifts the GNSS information by the GNSS delay time to subjects the GNSS information to the delay time correction (S28, corresponding to a delay time correction step) and terminates the delay time correction processing. By performing the delay time correction processing, as illustrated in FIG. 12, the control unit 10 reduces a difference between the feature position of the probe data and the original feature position to avoid being affected by steady communication delay.

The control unit 10 integrates the probe data corrected by the reception variation correction processing and the delay time correction processing to generate map data (S4, corresponding to a map data generation step) and terminates the map data generation process to wait until a start event of a next map data generation process is executed.

Although a case has been exemplified in which GNSS information is acquired at intervals of 1[s], and the result of image recognition of the camera image is acquired at intervals of 0.1[s], the interval at which GNSS information is acquired and the interval at which the result of image recognition of the camera image is acquired are not limited to the exemplified values. For example, GNSS information may be acquired at intervals of 0.1[s], and the result of image recognition of the camera image may be acquired at intervals of 0.01[s]. In addition, a case has been exemplified in which correlation coefficients are calculated by shifting vehicle speed of the vehicle sensor by 0.1[s]. However, the time by which vehicle speed of the vehicle sensor is shifted is not limited to the exemplified value. For example, correlation coefficients may be calculated by shifting vehicle speed of the vehicle sensor by 0.05[s]. It is noted that although the vehicle speed is recorded at intervals of 0.1[s], a correlation coefficient can be calculated with a resolution higher than the interval at which the vehicle speed is recorded by performing interpolation for the vehicle speed stored at intervals of 0.1[s] to calculate a vehicle speed at intervals of 0.05[s].

Figure 13:
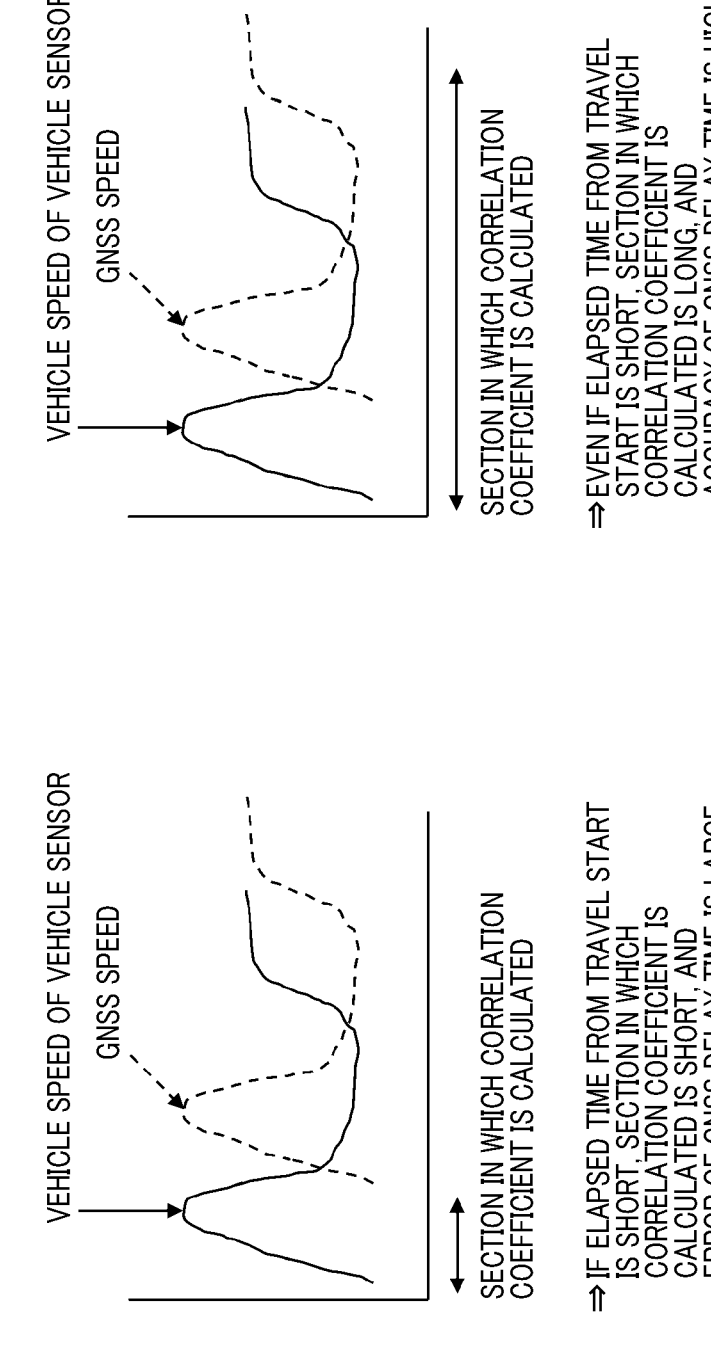
FIG. 13 is a diagram illustrating sections in which a correlation coefficient is calculated.

In the present embodiment, correlation coefficients are not calculated in the in-vehicle device 2 but are calculated in the server 3. Hence, as illustrated in FIG. 13, accumulating vehicle speeds of the vehicle sensor and GNSS speeds in the server 3 can lengthen a section in which correlation coefficients are calculated, whereby accuracy of the GNSS delay time can be increased.

In addition, although a configuration has been exemplified in which the server 3 performs the reception variation correction processing and the delay time correction processing, the in-vehicle device 2 may perform the reception variation correction processing and the delay time correction processing. Although a configuration has been exemplified in which the in-vehicle device 2 transmits the positioning time information, a free-run counter may be used to transmit a count value of the free-run counter to the server 3.

Figure 14:
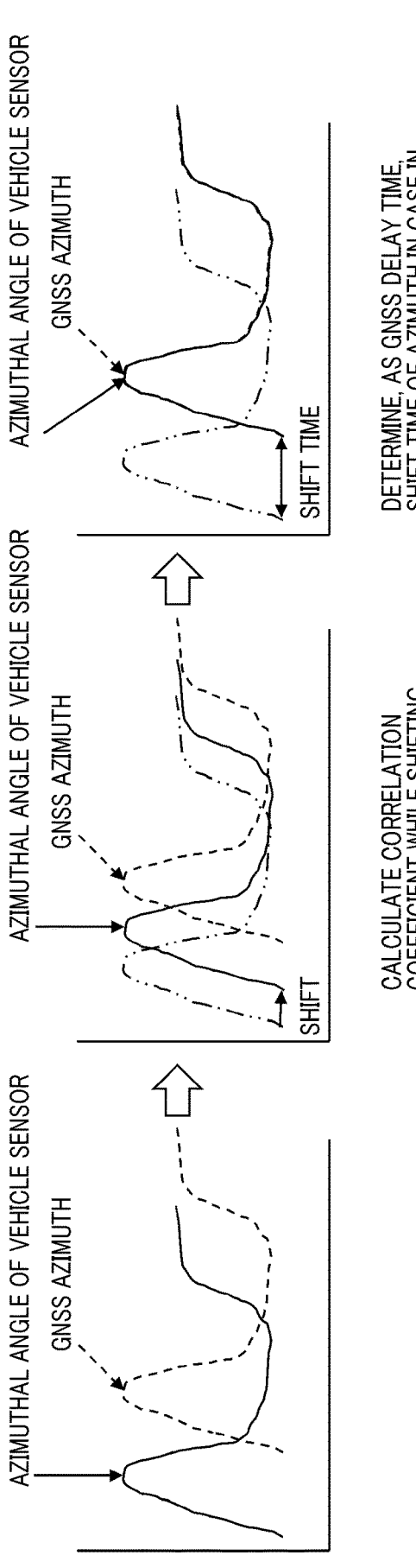
FIG. 14 is a diagram illustrating a mode in which GNSS delay time is calculated.

In addition, although a configuration has been exemplified in which a correlation between a vehicle speed of the vehicle sensor and a GNSS speed is calculated to calculate GNSS delay time, as illustrated in FIG. 14, a correlation between an azimuthal angle of the vehicle sensor and a GNSS azimuth may be calculated to calculate GNSS delay time. In addition, a correlation between a distance difference between the previous position and the current position calculated based on the travel information and a distance difference between the previous position and the current position of the GNSS information may be calculated to calculate GNSS delay time. That is, any index value that can calculate a correlation between travel information and GNSS information may be used. As the travel information, information indicating behavior of the vehicle may be used, for example, at least one of a three-dimensional position, a three-dimensional speed, a three-dimensional azimuth, a three-dimensional acceleration, and a three-axis rotation speed. As the GNSS information, information indicating behavior of the vehicle may be used, for example, at least one of a three-dimensional position, a three-dimensional speed, a three-dimensional azimuth, a three-dimensional acceleration, and a three-axis rotation speed.

As described above, according to the present embodiment, the following effects can be obtained.

In the server 3, GNSS information is subjected to reception variation correction based on positioning time information, probe data is corrected using the GNSS information that has been subjected to the reception variation correction and delay time correction, and map data is generated using the corrected probe data. Subjecting the GNSS information to the reception variation correction can generate map data more appropriately in a state in which, in addition to influence of steady communication delay, influence of a short-term variation is avoided.

In the server 3, a correlation coefficient indicating a correlation between travel information and GNSS information included in probe data is calculated. GNSS delay time is calculated based on the calculated correlation coefficient. The GNSS information is subjected to delay time correction based on the calculated GNSS delay time. The probe data is corrected using the GNSS information that has been subjected to the delay time correction. Map data is generated using the corrected probe data. Utilizing the correlation between travel information and GNSS information to subject the GNSS information to the delay time correction and correcting probe data using the GNSS information that has been subjected to the delay time correction generate map data. Hence, the map data can be appropriately generated in a state in which influence of steady communication delay is avoided.

In the server 3, probe data is corrected using the GNSS information that has been subjected to the reception variation correction and thereafter subjected to the delay time correction, to generate map data using the corrected probe data. Performing the reception variation correction first and then performing the delay time correction can avoid influence of steady communication delay in a state in which influence of a short-term variation is avoided.

The present disclosure has so far been described based on embodiments. However, the present disclosure should not be construed as being limited to these embodiments or the structures. The present disclosure should encompass various modifications, or modifications within the range of equivalence. In addition, various combinations and modes, as well as other combinations and modes, including those which include one or more additional elements, or those which include fewer elements should be construed as being within the scope and spirit of the present disclosure.

The control unit and the processing thereof described in the present disclosure may be implemented by a dedicated computer which is provided by configuring a processor and a memory that are programmed to execute one or more functions embodied by a computer program. Alternatively, the control unit and the processing thereof described in the present disclosure may be implemented by a dedicated computer which is provided by configuring a processor with one or more dedicated hardware logic circuits. Alternatively, the control unit and the processing thereof described in the present disclosure may be implemented by one or more dedicated computers which are configured by combining a processor and a memory that are programmed to execute one or more functions, with a processor that is configured by one or more hardware logic circuits. Furthermore, the computer program may be stored in a computer readable non-transitory tangible storage medium, as instructions to be executed by the computer.

An aspect of the present disclosure provides a map data generation device (3) that receives probe data including travel information and GNSS information from an in-vehicle device. The map data generation device including: a correlation coefficient calculation unit (10b) that calculates a correlation coefficient indicating a correlation between the travel information and the GNSS information included in probe data; a delay time calculation unit (10c) that calculates GNSS delay time based on the correlation coefficient; a delay time correction unit (10d) that performs delay time correction for the GNSS information based on the GNSS delay time; and a map data generation unit (10e) that corrects the probe data using the GNSS information that has been subjected to the delay time correction to generate map data using the corrected probe data.

A correlation coefficient indicating a correlation between travel information and GNSS information included in probe data is calculated. GNSS delay time is calculated based on the calculated correlation coefficient. The GNSS information is subjected to delay time correction based on the calculated GNSS delay time. The probe data is corrected using the GNSS information that has been subjected to the delay time correction. Map data is generated using the corrected probe data. Utilizing the correlation between travel information and GNSS information to subject the GNSS information to the delay time correction and correcting probe data using the GNSS information that has been subjected to the delay time correction generate map data.

Hence, the map data can be appropriately generated in a state in which influence of steady communication delay is avoided.

What is claimed is:

1. A map data generation device that receives probe data including travel information obtained by a vehicle sensor of a vehicle and GNSS information received from a GNSS receiver of the vehicle, the map data generation device comprising:
a memory that stores a computer program; and
a processor that executes the computer program to:
calculate a correlation coefficient indicating a correlation between the travel information and the GNSS information included in probe data for each of a plurality of datasets with different shift time between the travel information and the GNSS information, wherein the probe data is received from an in-vehicle device of the vehicle;
calculate GNSS delay time based on the correlation coefficient of each of the plurality of datasets, wherein the GNSS delay time indicates the shift time between the travel information and the GNSS information;
perform delay time correction in a time direction for the GNSS information based on the GNSS delay time;
correct the probe data using the GNSS information that has been subjected to the delay time correction to generate map data using the corrected probe data; and
store the corrected probe data in a map storage.

2. The map data generation device according to claim 1, wherein
the processor uses, as the travel information, information indicating behavior of the vehicle, which is at least one of a three-dimensional position, a three-dimensional speed, a three-dimensional azimuth, a three-dimensional acceleration, and a three-axis rotation speed, and uses, as the GNSS information, information indicating behavior of the vehicle, which is at least one of a three-dimensional position, a three-dimensional speed, a three-dimensional azimuth, a three-dimensional acceleration, and a three-axis rotation speed.

3. The map data generation device according to claim 1, wherein the processor also executes the computer program to:
perform reception variation correction for the GNSS information based on positioning time information corresponding to the GNSS information; and
correct the probe data using the GNSS information that has been subjected to the reception variation correction and the delay time correction to generate the map data using the corrected probe data.

4. The map data generation device according to claim 3, wherein the processor also executes the computer program to:
correct the probe data using the GNSS information that has been subjected to the reception variation correction and thereafter subjected to the delay time correction to generate the map data using the corrected probe data.

5. A map data generation system including an in-vehicle device of a vehicle that transmits probe data including travel information obtained by a vehicle sensor of the vehicle and GNSS information received from a GNSS receiver of the vehicle, and a map data generation device that receives the probe data from the in-vehicle device, the system comprising:
a memory that stores a computer program; and a processor that executes the computer program to:

calculate a correlation coefficient indicating a correlation between the travel information and the GNSS information included in the probe data for each of a plurality of datasets with different shift time between the travel information and the GNSS information, wherein the probe data is received from the in-vehicle device;

calculate GNSS delay time based on the correlation coefficient of each of the plurality of datasets, wherein the GNSS delay time indicates the shift time between the travel information and the GNSS information;

perform delay time correction in a time direction for the GNSS information based on the GNSS delay time;

correct the probe data using the GNSS information that has been subjected to the delay time correction to generate map data using the corrected probe data; and store the corrected probe data in a map storage.

6. The map data generation system according to claim 5, wherein the processor uses, as the travel information, information indicating behavior of the vehicle, which is at least one of a three-dimensional position, a three-dimensional speed, a three-dimensional azimuth, a three-dimensional acceleration, and a three-axis rotation speed, and uses, as the GNSS information, information indicating behavior of the vehicle, which is at least one of a three-dimensional position, a three-dimensional speed, a three-dimensional azimuth, a three-dimensional acceleration, and a three-axis rotation speed.

7. The map data generation system according to claim 5, wherein the processor also executes the computer program to:

perform reception variation correction for the GNSS information based on positioning time information corresponding to the GNSS information; and correct the probe data using the GNSS information that has been subjected to the reception variation correction and the delay time correction to generate the map data using the corrected probe data.

8. The map data generation system according to claim 7, wherein the processor also executes the computer program to:

correct the probe data using the GNSS information that has been subjected to the reception variation correction and thereafter subjected to the delay time correction to generate the map data using the corrected probe data.

9. A non-transitory computer-readable storage medium in which a map data generation program is stored to cause a computer to execute processing, which receives probe data from an in-vehicle device of a vehicle, the probe data including travel information obtained by a vehicle sensor of the vehicle and GNSS information received from a GNSS receiver of the vehicle, the processing comprising:

calculating a correlation coefficient indicating a correlation between travel information and GNSS information included in probe data for each of a plurality of datasets with different shift time between the travel information and the GNSS information, wherein the probe data is received from the in-vehicle device;

calculating GNSS delay time based on the correlation coefficient of each of the plurality of datasets, wherein the GNSS delay time indicates the shift time between the travel information and the GNSS information;

performing delay time correction in a time direction for the GNSS information based on the GNSS delay time;

correcting the probe data using the GNSS information that has been subjected to the delay time correction to generate map data using the corrected probe data; and storing the corrected probe data in a map storage unit.

* * * * *